United States Patent Office 3,658,872
Patented Apr. 25, 1972

3,658,872
PERFLUORO-ALKYL-CONTAINING
SULFONATE ESTERS
Claude I. Merrill, Lancaster, Calif., assignor to The
Dow Chemical Company, Midland, Mich.
No Drawing. Filed June 20, 1967, Ser. No. 647,336
Int. Cl. C07c *143/68*
U.S. Cl. 260—456 R                                2 Claims

ABSTRACT OF THE DISCLOSURE

Novel haloesters and a method of their preparation are disclosed. These compounds exhibit excellent thermal stability and oxidation resistant characteristics when subjected to elevated temperatures.

BACKGROUND OF THE INVENTION

The invention herein described was made in the course of or under a contract or subcontract thereunder with the Department of the Air Force.

This invention relates to novel halogenated ester compounds containing fluorine and more particularly is concerned with polyfluoroalkylsulfonate and carboxylate esters and to a method of their preparation.

SUMMARY

The present invention comprises halogenated carboxylate and sulfonate esters corresponding respectively to the general Formulas I and II

wherein R is a halogen or an aliphatic, aromatic, or alkaryl group having from 1 to about 20 carbon atoms, and R' is a perhaloaliphatic group having from 1 to about 20 carbon atoms, preferably containing from 1 to about 6 carbon atoms.

These compounds are prepared by reacting a perhaloalkoxide source material with an acid halide such as an aliphatic, aromatic or alkaryl acyl- or sulfonyl halide, carbonyl chloride, carbonyl fluoride or sulfuryl halide in the presence of an alkali metal fluoride.

DESCRIPTION OF PREFERRED EMBODIMENTS

A preferred embodiment of the present invention comprises polyfluoroalkyl carboxylate and sulfonate esters.

The heptafluoroisopropyl esters are examples of specific preferred embodiments of the present invention.

The present novel compounds possess good thermal and oxidation resistance. They find utility as brake and other hydraulic fluids, electrical insulators, monomers for the preparation of heat and oxidation resistant polymers and the like applications wherein thermal and oxidative stability are required at elevated temperatures. Additionally, they are both oleophobic and hydrophobic thus finding application as oil and water repellants.

In accordance with the present invention, the novel compounds of the preferred embodiment ordinarily are prepared by reacting an acid halide as set forth hereinbefore with an alkoxide source material such as a perhaloketone or perhaloacyl fluoride in the presence of an alkali metal fluoride, particularly for example, potassium fluoride, cesium fluoride or rubidium fluoride in an inert aprotic organic polar solvent.

Usually, an addition product of the alkoxide source material, e.g. a perfluoroketone and alkali metal fluoride, is prepared by direct reaction of these reactants. The quantity of alkali metal fluoride to be employed at a minimum is about that required stoichiometrically for reaction with the ketone to form a 1:1 addition product. An excess of the alkali metal fluoride up to about 500 weight percent of that required stoichiometrically can be used. Ordinarily about stoichiometric quantities are employed.

The resulting addition product reactant and acid halide in the presence of the inert solvent usually are maintained under the autogenous pressure generated by the reaction mass at a maximum temperature of about 25° C., i.e. room temperature, usually at a maximum of about 0° C. and preferably at from about minus 50° C. to about 0° C. for a period of from about 0.5 to about 24 hours or more and ordinarily from about 1 to about 6 hours. In most operations, the reaction mass is continuously agitated during this period.

Alternatively, the acid halide reactant, alkoxide source material and alkali metal fluoride can be introduced at the same time into a reaction vessel along with the solvent. It is not necessary to first separately prepare the carbonyl-alkali metal addition product.

Following the reaction period, usually the product mass is washed with water and the corresponding ester recovered and purified as by fractional distillation, vapor phase chromatography or other liquid-liquid separatory procedures.

The relative quantities of acid halide reactant and alkoxide source material to be employed are not critical; usually at a minimum about stoichiometric amounts as needed to provide the alkoxy product are used. Ordinarily a slight excess of the alkoxide reactant is used, e.g. up to about 120 weight percent of that required stoichiometrically. The actual quantities employed are those such that unwieldly large volumes are not encountered which would require large storage vessels, transportation systems and reactors.

Alkoxide source materials suitable for use in the present invention are the perhalo alcoholates, such as e.g. the alkali metal methylates, ethylates, propylates, cyclobutylates, cyclopentylates, cyclohexylates (i.e. alkali metal alkoxides), perhaloketones, perhalogenated acid halides which form an anion, e.g. perfluoroacetyl fluoride, carbonyl fluoride and the like. Specific examples of suitable ketone reactants are perfluoroacetone, perchloacetone, mixed perhalosubstituted acetones such as dichlorotetrafluoroacetone, tetrachlorodifluoroacetone, monochloropentafluoroacetone, perfluorocyclobutanones, perfluorocyclopentanones, perfluorocyclohexanones and the like.

Acid halides found to be particularly suitable for use in the present invention are acetyl chloride

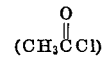

benzene sulfonyl chloride

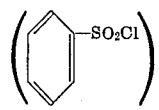

benzoyl chloride

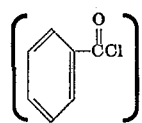

sulfuryl chloride ($SO_2Cl_2$), phosgene

methyl sulfonyl chloride ($CH_3SO_2Cl$), and the like.

Solvents suitable for use are those aprotic polar organic liquids which are inert to the reactants and products and which will dissolve these materials. Conveniently, the higher boiling ethers such as β,β-dimethoxy-diethyl ether (commonly referred to as diglyme), N,N-dimethylformamide, acetonitrile, tetramethylene sulfone, N,N-dimethylacetamide and the like are employed as solvents.

The process usually is carried out under the autogenous pressure of the reaction mixture but either higher or lower pressures can be used.

The following examples will serve to further illustrate the present invention but are not meant to limit it thereto.

PREPARATION OF CARBOXYLATE ESTERS

Example 1

About 29 grams (~0.5 gram mole) of potassium fluoride was placed in a pressure vessel, along with about 75 milliliters of acetonitrile solvent and a magnetic stirring bar. About 93 grams (~0.56 gram mole) of hexafluoroacetone was added after cooling the reactor by vacuum transfer technique. The reaction vessel was sealed and warmed to room temperature whereupon a mildly exothermic reaction took place resulting in the formation of 1:1 addition product of potassium fluoride:hexafluoroacetone, corresponding to the formula $KOCF(CF_3)_2$. The vessel then was cooled with liquid nitrogen and about 37 grams of acetyl chloride

(CH₃CCl)

vacuum transferred into the vessel. As the reaction vessel was warmed, a reaction occurred below room temperature as shown by the formation of insoluble potassium chloride. After about 16 hours, the reactor was opened and water added thereto whereupon an oil layer separated. This layer was washed three times with water in a separatory funnel and dried for about ½ hour over anhydrous calcium sulfate.

Elemental chemical analysis of the oil product gave H—1.29 percent; C—26.55 percent and F—56.5 percent. Calculated theoretical analysis for heptafluoroisopropyl acetate corresponding to the formula

CH₃COCF(CF₃)₂ is H—1.32 percent, C—26.31 percent, F—58.4 percent.

Molecular weight as determined experimentally was 238. The calculated molecular weight is 228.

Infrared spectrum showed absorbency bands at 2.86, 3.38, 3.52, 5.50, 5.65, 7.02, 7.34, 7.60, 7.72, 8.03, 8.30, 8.49, 8.78, 8.95, 9.40, 9.88, 10.09, 11.80, 12.89, 13.50 and 14.09 microns.

Nuclear responance data are:
(Relative to $CFCl_3$ for $F^{19}$):

+139.9(OCF)
+78.1(CF₃)

Mass spectral data in the order of decreasing intensity indicated $CH_3CO^+$, $CH_3^+$, $CF_3^+$ $CH_2CO^+$,

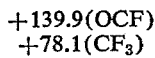
CH₃COOC₃F₆⁺

M⁺ (molecular ion),

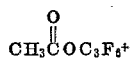
COC₃F₇⁺

These analyses are consistent with the ester structure.

When placed in contact with water for a period of over 18 hours the compound was found to be stable and found to undergo substantially no degradation.

Following the same technique as described directly hereinbefore but utilizing 29 grams of potassium fluoride, 88 grams of hexafluoroacetone, 58 milliliters (70.2 grams, 0.5 gram mole) of benzoyl chloride

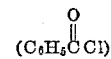
(C₆H₅CCl)

and about 250 milliliters of diglyme solvent and providing an initial temperature of about minus 40° C., heptafluoroisopropyl benzoate was prepared in about 85% yield. The product was purified by preparative scale gas chromatography and the structure provide by the following analyses.

Elemental chemical analysis found C—43.5%; H—2.11%; F—43.2%. Theoretical calculated analysis for

C₆H₅COCF(CF₃)₂ is C—43.4%, H—2.06%, F—43.2%.

Nuclear magnetic resonance data are:
(Relative to $CFCl_3$ for $F^{19}$):

+140.2(OCF)
+77.9(CF₃)

(Relative to tetramethylsilane for $H^1$):

~—8.0 (2CH) ortho
~—7.5 (3CH) meta-para

Mass spectral data show in the order of decreasing intensity: $C_6H_5CO^+$, $C_6H_5^+$, $M^+$, $CF_3^+$, $C_6H_5CO_2C_3F_6^+$, $C_3F_7^+$.

Example 2

About 12.38 grams (0.125 gram mole) of phosgene was vacuum transferred at about minus 196° C. into a pressure vessel reactor containing about 0.25 gram mole of a potassium fluoride·hexafluoroacetone adduct. The $KF·(CF_3)_2CO$ complex had been prepared following the technique described hereinbefore by reacting 14.5 grams KF and 44 grams hexafluoroacetone in 300 milliliters of diglyme. The reaction vessel was immersed in a cold bath at minus 55° C. and maintained under constant agitation for about 48 hours. During the reaction period, the temperature rose to about 5° C. Following the reaction period, all of the volatile materials were vacuum transferred from the vessel and subjected to vapor phase chromatographic separation. Large amounts of carbonyl fluoride and hexafluoroacetone were found to be persent in the product mixture. Also isolated, as identified by analysis, were perfluoroisopropyl fluoroformate,

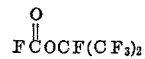
FCOCF(CF₃)₂ in about 3 percent yield (elemental chemical analysis C—19.6%; theoretical C—20.7%) and hexafluorochlorisopropyl fluoroformate

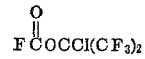
FCOCCl(CF₃)₂ in about 3 percent yield. Additionaly, bis(heptafluoroisoproyl)-carbonate

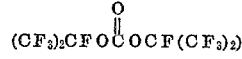
(CF₃)₂CFOCOCF(CF₃)₂ was also prepared in about 2 percent yield. (Elemental chemical analysis C—21.1%; F—66.9%; theoretical C—21.1%; F—66.9%).

This study was repeated using a reaction time of about 6 hours while maintaining the reaction temperature between about minus 55 and minus 47° C. Volatile products recovered and separated by vapor phase chromatography from this run indicated about 45 percent yield of

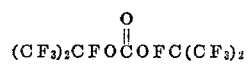
(CF₃)₂CFOCOFC(CF₃)₂ about 10 percent yield of

and about 10 percent of

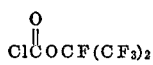

i.e. perfluoroisopropylchloroformate (elemental chemical analysis C—19.4%; F—54.4%; theoretical C—19.39%; F—53.1%) and about 10 percent of hexafluorochloroisopropyl chloroformate,

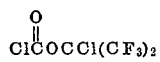

(Elemental chemical analysis was C—19.9%; F—46.2%; Cl—23.0%; theoretical C—18.1%; F—43.0%; Cl—26.8%.)

Infrared spectrum of these various compounds showed absorbency peaks as follows; perfluoroisopropyl fluoroformate: 5.29, 7.68, 7.95, 8.26, 8.53, 8.79, 9.88, 10.58, 12.55, 13.10, 13.25, 13.33 and 13.89 microns; hexafluorochloroisopropyl fluoroformate: 5.29, 5.38, 5.44, 7.82, 7.96, 8.29, 8.41, 8.97, 9.38, 10.42, 10.73, 13.07, 13.53 and 14.50 microns; bis(heptafluoroisopropyl)carbonate; 5.39, 7.69, 7.97, 8.21, 8.38, 8.63, 9.18, 9.85, 10.39, 12.95, 13.28 and 13.80 microns.

Nuclear magnetic resonance data support the assigned structure.

Example 3

About 14.56 grams (~0.60 gram mole) of potassium perfluorocyclobutoxide in about 150 milliliters of diglyme was reacted in a pressure vessel with about 4.8 grams (~0.06 gram mole) of acetyl chloride

for about 24 hours starting with an initial temperature of about —50° C. and warming gradually to about room temperature over the reaction period. The potassium perfluorocyclobutoxide was prepared by reacting a substantially 1:1 mixture of fluorosulfatoheptafluorocyclobutane

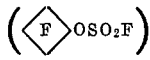

with KF in the diglyme at room temperature in a sealed pressure vessel.

The oil product was recovered by water extraction. About 7.07 grams of heptafluorocyclobutyl acetate was recovered indicating a yield of about 48 percent. The structure of this compound was proved by the following analysis.

Elemental chemical analysis found C—30.3%; H—1.5%; F—55.4%. Theoretical calculated analysis for

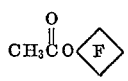

heptafluorocyclobutyl acetate, is C—30.0%; H—1.25%; F—55.4%.

Nuclear magnetic resonance data:

(Relative to $CFCl_3$ for $F^{19}$):

+138.5 (OCF)

+131.0 (4 CF)

+132.6 (2 CF)

Mass spectral data in order of decreasing intensity gave $CH_3CO^+$, $CH_3^+$, $C_3F_5^+$, $C_2F_4^+$, $COF^+$, $M^+$.

In a third preparation, about 29.6 grams of potassium perfluorocyclobutoxide were reacted in a similar manner with 17.6 grams of benzoyl chloride; about 28.4 grams of a dried product was recovered.

Elemental analysis showed C—43.4 percent; H—1.9 percent; F—44.0 percent. Theoretical analysis for heptafluorocyclobutyl benzoate corresponding to the formula

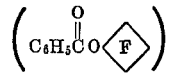

is C—43.7 percent; H—1.66 percent; F—44.0 percent.

The nuclear magnetic resonance data showed:

(Relative to $CFCl_3$ for $F^{19}$):

+139.0 (OCF)

+131.6 (2 CF)

+131.8 (2 CF)

+133.4 (2 CF)

Mass spectroscopy analysis was consistent with the assigned structure and gave in order of decreasing intensity $C_2H_5CO^+$, $C_6H_5^+$, $M^+$, $C_2F_4^+$, $C_3F_5^+$, $C_6H_5CO_2C_4F_6^+$.

PREPARATION OF SULFONATE ESTERS

Example 4

Following the general procedure described in Example 1, a

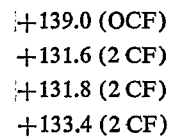

adduct was prepared in a 12 ounce volume pressure tube by reacting 29 grams of potassium fluoride (0.5 gram mole) and 88 grams of hexafluoroacetone (~0.5 gram mole) using diglyme as a solvent. Following the preparation of the adduct, the reaction vessel was cooled to about minus 35° C. and opened to the atmosphere. About 64 milliliters (~88 grams, 0.5 gram mole) of benzenesulfonyl chloride

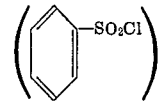

was added slowly thereto. During this last addition, the temperature rose to about minus 30° C. The reactor was then sealed and maintained at about minus 30° C. for a period of about 18 hours during which time the reactor contents were continually stirred by means of a magnetic stirrer. Following the reaction period, the product mixture was washed with water whereupon an oil layer separated. This oil layer was washed with water and yielded about 130 grams of crude product. This material was placed in a 2,000 milliliter Erlenmeyer flask along with 800 milliliters of water and stirred overnight. Following this washing action, the oil layer was isolated and dried yielding about 97.5 grams of product.

Elemental chemical analysis of the product gave H—2.20 percent; C—37.4 percent. Theoretical calculated analysis for heptafluoroisopropyl benzenesulfonate corresponding to the formula $C_6H_5SO_2OCF(CF_3)_2$ is H—2.22; C—37.0.

Infrared spectrum showed absorbency bands at 3.24, 6.31, 6.92, 7.13, 7.61, 7.70, 8.0, 8.29, 8.49, 8.72, 9.02, 9.26, 9.76, 10.13, 10.72, 12.50, 12.70, 13.34, 13.83, 13.97 and 14.69 microns.

The nuclear magnetic resonance analysis provided a $H^1$ spectrum characteristic of a phenyl group. Other NMR data were as follows:

(Relative to $CFCl_3$ for $F^{19}$):

+80.29 doublet ($CF_3$)

+142.74 a heptet (OCF)

$J(CF—CF_3) = 2.3$ cps.

These latter data substantiate the assigned structure.

Example 5

Following the same general procedure described in the preceding examples about 14.5 grams of potassium fluoride and 44 grams of hexafluoroacetone were reacted at room temperature in a pressure vessel in the presence of about 250 milliliters of diglyme solvent. After the preparation of the corresponding 1:1 adduct was complete, the reactor was cooled to about minus 50° C. and 10 milliliters (16.67 grams) of sulfuryl chloride ($SO_2Cl_2$) was introduced therein by means of a syringe. The reaction mixture was continuously agitated over a 16 hour period during which time the bath temperature rose to about 5° C. The resulting product mixture was extracted with water and an oil layer isolated which was dried over anhydrous magnesium sulfate in a vacuum flask. Volatile materials present in the dried oil were vacuum transferred from the flask and purified by vapor phase chromatography. About 0.6 gram of product was recovered.

Elemental analysis showed C—13.4%; F—55.5%; S—11.8%. Calculated theoretical analysis for heptafluoroisopropylfluorosulfonate corresponding to the empirical formula $(CF_3)_2CFOSO_2F$) is C—13.4%; F—56.0%; S—11.9%.

A gas density molecular weight determination gave 268.8. Theoretical molecular weight for this sulfonate ester is 268.0.

Infrared spectrum showed absorbency peaks at 6.72, 7.63, 7.94, 8.32, 8.51, 9.10, 10.02, 11.54, 11.91, 13.02, 13.69, 14.25 and 14.60 microns. These are consistent with the assigned structure.

The nuclear magnetic resonance analysis showed:

(Relative to $CFCl_3$ for $F^{19}$):

+141.7 (OCF)
+80.1 ($CF_3$)
−50.0 (SR)

In a second study repeating the preparation of the heptafluoroisopropyl fluorosulfonate, about 20 grams of potassium fluoride, 62 grams of hexafluoroacetone and 23.3 grams of sulfuryl chloride were reacted following the same general procedure as described directly hereinbefore except that the reaction vessel was cooled to minus 53° C. before introducing the sulfonyl chloride therein and the reaction was run for a 6 hour period while maintaining the temperature at from about minus 53 to minus 35° C. Following the 6 hour reaction period, the product mixture was transferred by vacuum transfer techniques over about a 3 hour period during which time the temperature on the product mixture rose to about 0° C. The product characteristics were the same as that of the heptafluoroisopropyl fluorosulfonate ester of the previous run. The product yield was about 35 percent based on the starting reactants.

Example 6

About 7.3 grams of potassium fluoride was placed in a pressure vessel reactor and about 200 milliliters diglyme solvent added thereto. The reactor was sealed and cooled to about minus 196° C. and evacuated whereupon about 35.1 of fluorosulfatoperfluorocyclobutane

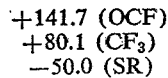

was vacuum transferred therein. The reactor was warmed to room temperature and the product mixture stirred for about 2 hours after which sulfuryl fluoride was stripped therefrom at room temperature and the reactor containing potassium perfluorocyclobutoxide

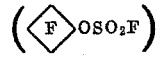

removed from the low pressure line. The reactor was placed in a cold bath maintained at about minus 50° C., cooled, opened and about 22.2 grams of benzenesulfonyl chloride added thereto by means of a syringe. The reactor was sealed and maintained for a total of about 72 hours within a temperature range of from about minus 50° C. to about room temperature. After this period, the reactor was opened and the product extracted with water, the oil-like product was separated from the water, dried over magnesium sulfate and recovered by filtration. The resulting product was subjected to vapor phase chromatography for purification.

Elemental chemical analysis gave C—36.2%; H—1.7%. Theoretical calculated analysis for heptafluorocyclobutyl benzenesulfonate is C—35.5%; H—1.5%.

Nuclear magnetic resonance data found:

(Relative to $CFCl_3$ for $F^{19}$):

+137.2 (OCF)
+129.5 (2 CF)
+131.6 (2 CF)
+133.3 (2 CF)

Mass spectral data in order of decreasing intensity gave $C_6H_5^+$, $C_6H_5SO_2^+$, $CF_2^+$, $C_2F_3^+$, $C_2F_2^+$, $M^+$, $C_4F_6^+$.

These analyses all support the product structure of heptafluorocyclobutyl benzenesulfonate.

Example 7

About 19.81 grams of potassium fluoride and 60.5 grams of hexafluoroacetone were reacted in about 350 milliliters of diglyme following the procedures set forth hereinbefore to provide the 1:1 adduct. The reaction vessel was then cooled to about minus 50° C., opened and about 22.5 milliliters of methylsulfonyl chloride added thereto. The reactor was then sealed and stirred continuously by means of a magnetic stirrer over about a 24 hour period during which time the temperature rose to about 0° C. Two water extractions of the product mass provided upon separation about 42 grams of an oil. This was dried and subjected to vapor phase chromatographic separation. Heptafluoroisopropyl methanesulfonate,

as subsequently identified by analysis, was produced in about 42 percent yield.

Elemental chemical analysis gave C—18.5%; H—1.22%; F—50.3%. Theoretical carculated analysis is C—18.2%; H, 1.14%; F—50.4%.

Nuclear magnetic resonance data found:

(Relative to $CFCl_3$ for $CF^{19}$):

+141.7 (OCF)
+80.1 ($CF_3$)
−50.0 (SF)

Mass spectroscopy analysis indicated the following in decreasing order of intensity: $CF_3^+$, $SO_2F^+$, $C_2F_3O^+$, $C_3F_7^+$, $C_2F_5O_3S^+$, $C_3F_7O_3S^+$.

These data are consistent with the assigned structure.

Example 8

About 5.8 grams (0.1 gram mole) of potassium fluoride was place in a 12 oz. pressure vessel in a dry box. The reactor and its contents were removed from the box and 100 milliliters of N,N-dimethyl formamide added under an inert atmosphere. The reactor was cooled to minus 196° C. and subjected to a reduced pressure whereupon about 11.6 grams (0.11 gram mole) of perfluoroacetyl fluoride

was transferred by vacuum technique into the reactor and condensed therein.

The reactor was removed from the vacuum line and warmed to room temperature. The 1:1 addition complex ($CF_3CF_2OK$) formed in about 0.5 hour.

The reactor was cooled to about minus 15° C., opened under a nitrogen atmosphere and about 17 grams (~0.12 gram mole) of benzoyl chloride added thereto.

The reactor was placed in a cold bath and the contents maintained under constant agitation at a temperature of from about minus 10 to about minus 2° C. for 6 hours.

At the end of the reaction period, the reactor was opened and the product poured into a separatory funnel containing an excess of water. The oil product was extracted twice with water and dried over magnesium sulfate. About 18.8 grams of oil were recovered. This indicated about 78.5% yield of the ester, pentafluoroethyl benzoate.

The structure was proved by analysis.

Nuclear magnetic resonance analysis gave:

(Relative to $CFCl_3$ for $F^{19}$ and trimethylsilane for $H^2$):

$CF_3$ +87.23, 2.0 $H_2$ triplet
$CF_2$ +91.58, 2.0 $H_2$ quartet
$C_6H_5$ typical benzoate pattern
Ortho H at —7.96
Meta and para H —7.1 to —7.6, strongest peak at —7.5.

The infrared spectrum showed absorbance peaks at 5.5–5.7 (doublet), 6.3, 6.9, 8.2, 8.5–8.8 (broad band), 9.1–9.2 (broad band), 9.7, 9.9–10.0 (broad band), 12.05 and 14.3–14.4 microns.

A second preparation was made following the same general procedure by utilizing 5.8 grams of KF, 13.6 grams of

and 14.1 grams of benzoyl chloride in 200 milliliters of acetonitrile as solvent.

In this preparation the initial temperature of the reactor at the time of benzoyl chloride addition was about minus 40° C. The reaction was continued for about 24 hours during which time the temperature rose to 3° C.

About 16 grams of dried product was recovered indicating a yield of 67%.

Infrared spectrum and nuclear magnetic resonance data were the same as shown by the pentafluoroethyl benzoate product of the preceding run.

By following the procedures set forth in the foregoing examples, polyfluorocyclopentyl- and polyfluorocyclohexyl carboxylate and sulfonate esters also can be prepared.

Various modifications can be made in the present invention without departing from the spirit or scope thereof for it is understood that I limit myself only as defined in the appended claims.

I claim:

1. Halogenated sulfonate esters corresponding to the formula:

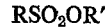

where R is an an alkyl or aryl grou phaving from 1 to about 20 carbon atoms and R' is perfluoromethyl or ethyl.

2. A process for preparing a halogenated sulfonate ester corresponding to the formula:

$RSO_2OR'$ where R is an alkyl or aryl group having from 1 to about 20 carbon atoms and R' is perfluoromethyl or ethyl which comprises:

(a) reacting at a maximum temperature of about 25° C. for at least about 2 hours a sulfonyl chloride corresponding to the formula $RSO_2Cl$ wherein R is an alkyl or aryl group having from one to about 20 carbon atoms with carbonyl fluoride or perfluoro acetyl fluoride in the presence of an alkali metal fluoride and an inert organic solvent, the quantities of said sulfonyl chloride and perfluoro acid fluoride at a minimum being about that required stoichiometrically for formation of said halogenated sulfonate ester, the quantity of said alkali metal fluoride at a minimum being about that required stoichiometrically to form a 1:1 addition product with said perfluoro acid fluoride; and (b) subjecting the resulting product mixture to a liquid-liquid separation procedure thereby separating and recovering said halogenated sulfonate ester.

References Cited

UNITED STATES PATENTS

| | | | |
|---|---|---|---|
| 3,177,260 | 4/1965 | Muray et al. | 260—456 P X |
| 3,030,409 | 4/1962 | Andreades et al. | 260—617 R X |
| 3,346,613 | 10/1967 | Larson et al. | 260—456 |
| 2,728,749 | 12/1955 | Coover | 260—456 R X |
| 3,214,464 | 10/1965 | Howard | 260—456 R X |
| 3,317,616 | 5/1967 | Weinmayr | 260—633 |
| 3,358,033 | 12/1967 | Anello | 260—633 X |
| 3,465,050 | 9/1969 | Pittman et al. | 260—633 |

OTHER REFERENCES

Chemical Abstracts, vol. 61, 6453F (1964).

C. M. Suter: "The Organic Chemistry of Sulfur" (N.Y. 1944), pp. 507–509.

Pittman and Sharp: "A New Class of Fluoroalkyl Acrylate Oil-Water Repellar.'s Based on Fluorinated Ketones," Textile Research Journal, vol. 35, pp. 190–191 (1965).

LEON ZITVER Primary Examiner

L. DeCRESCENTE, Assistant Examiner

U.S. Cl. X.R.

252—65, 78